US010864802B2

(12) United States Patent
Kakizaki et al.

(10) Patent No.: US 10,864,802 B2
(45) Date of Patent: Dec. 15, 2020

(54) VEHICLE AIR-CONDITIONING DEVICE

(71) Applicant: HONDA MOTOR CO., LTD., Tokyo (JP)

(72) Inventors: Shinji Kakizaki, Wako (JP); Subaru Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 214 days.

(21) Appl. No.: 16/139,120

(22) Filed: Sep. 24, 2018

(65) Prior Publication Data
US 2019/0092143 A1 Mar. 28, 2019

(30) Foreign Application Priority Data

Sep. 27, 2017 (JP) .................. 2017-186632

(51) Int. Cl.
*B60H 1/00* (2006.01)
*B60H 3/02* (2006.01)
*B60H 1/24* (2006.01)
*B60H 3/06* (2006.01)

(52) U.S. Cl.
CPC .......... *B60H 3/024* (2013.01); *B60H 1/00564* (2013.01); *B60H 1/00664* (2013.01); *B60H 1/00785* (2013.01); *B60H 1/248* (2013.01); *B60H 3/0608* (2013.01); *B60H 2003/028* (2013.01)

(58) Field of Classification Search
CPC ................ B60H 3/024; B60H 1/00785; B60H 2003/028
See application file for complete search history.

(56) References Cited

U.S. PATENT DOCUMENTS

| 5,697,223 | A | * | 12/1997 | Ishii | B60H 1/00785 165/231 |
| 8,769,978 | B2 | * | 7/2014 | Nakaguro | B60H 3/024 236/44 A |
| 9,028,591 | B2 | * | 5/2015 | Wang | B01D 53/261 95/117 |
| 9,463,683 | B2 | * | 10/2016 | Watanabe | B01D 53/261 |
| 9,592,796 | B2 | * | 3/2017 | Watanabe | B60H 3/024 |

(Continued)

FOREIGN PATENT DOCUMENTS

JP 2010137598 A * 6/2010
JP 4997218 8/2012

*Primary Examiner* — Leonard R Leo
(74) *Attorney, Agent, or Firm* — Amin, Turocy & Watson, LLP

(57) ABSTRACT

A flow channel located downstream of a temperature regulating device branches off into a first flow channel and a second flow channel. In the first flow channel, a windshield's-side flow channel connecting to a windshield's-side air outlet port and an adsorbent's-side flow channel connecting to an adsorbent inflow section are formed. At the time of regeneration treatment of an adsorbent, by interrupting communication between the first flow channel and the second flow channel, interrupting communication between a temperature regulating device outflow section and the windshield's-side air outlet port, and making the temperature regulating device outflow section and the adsorbent inflow section communicate with each other, the air warmed by the temperature regulating device is preferentially guided to the adsorbent.

6 Claims, 11 Drawing Sheets

(56) References Cited

U.S. PATENT DOCUMENTS

2013/0183894 A1\* 7/2013 Watanabe ............... B60S 1/023
454/127
2019/0077229 A1\* 3/2019 Nakamura ............. B60H 3/024

\* cited by examiner

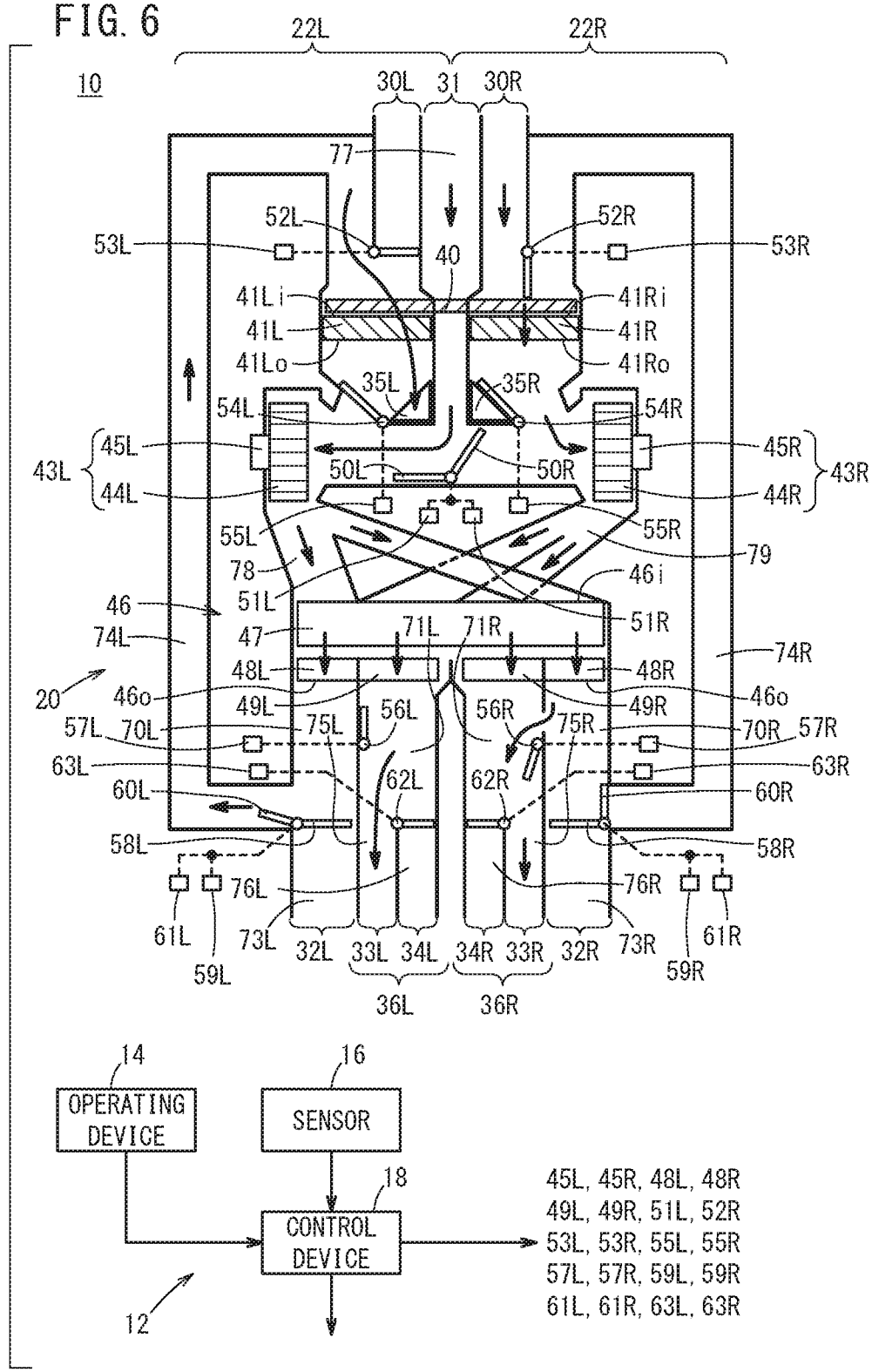

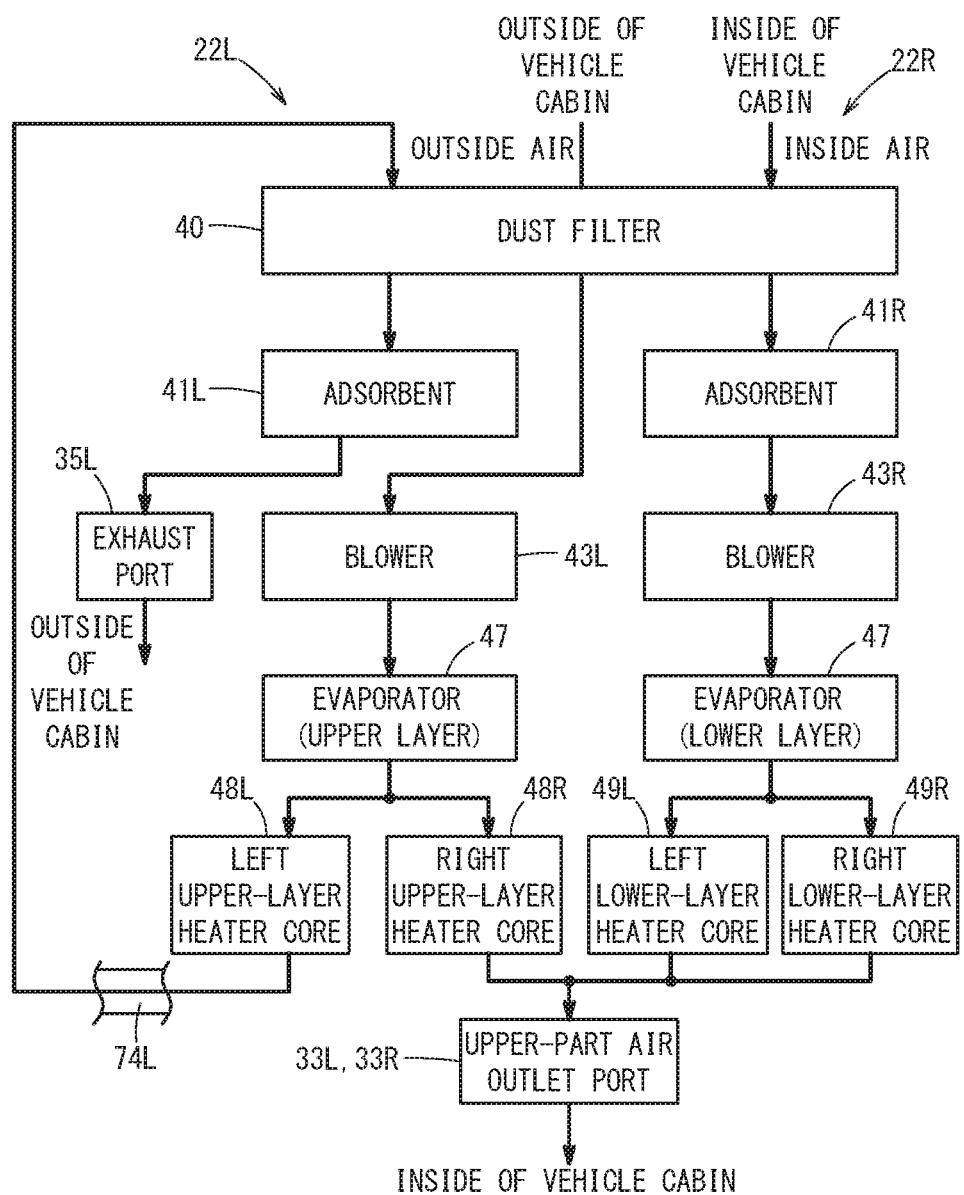

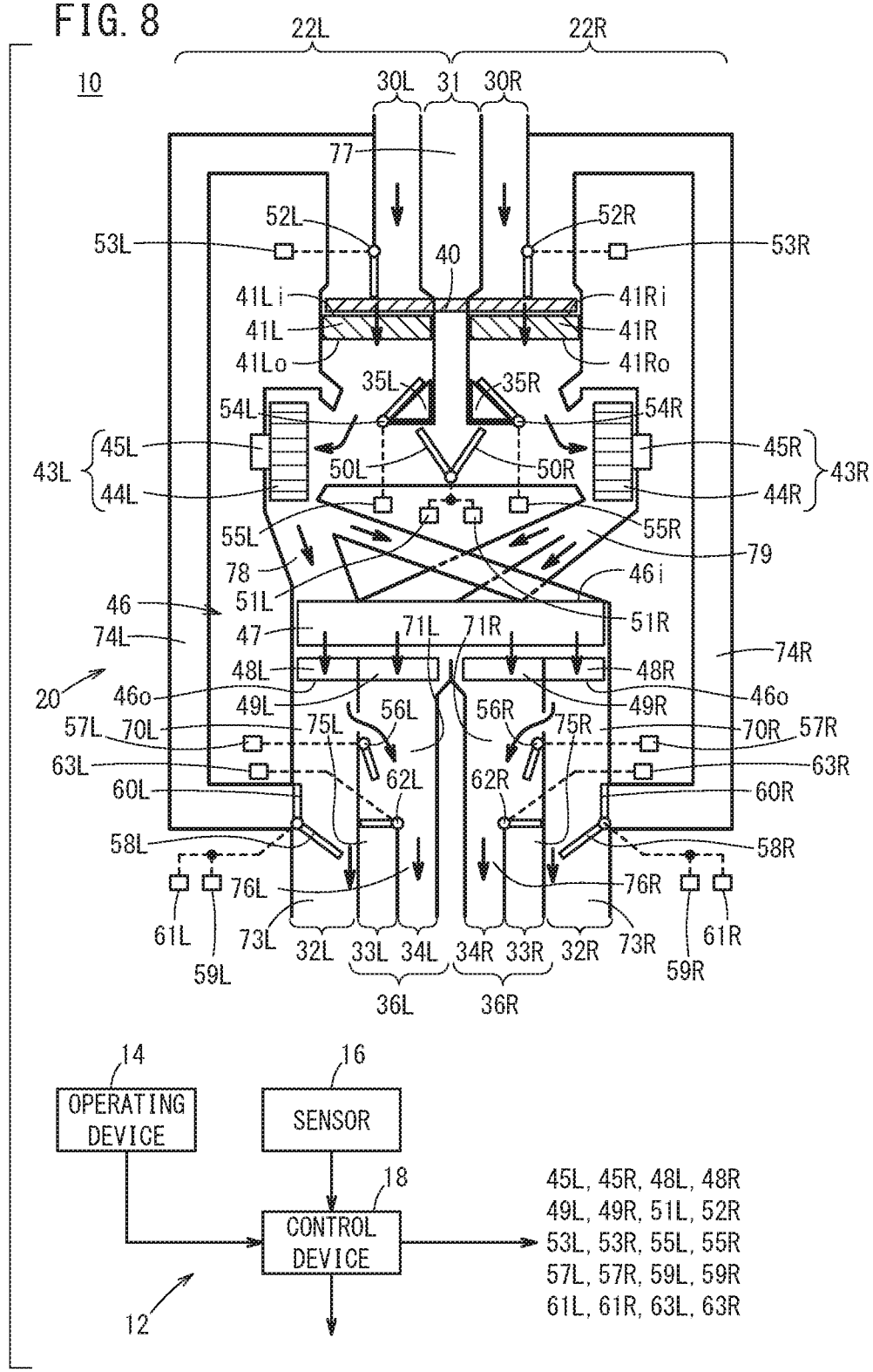

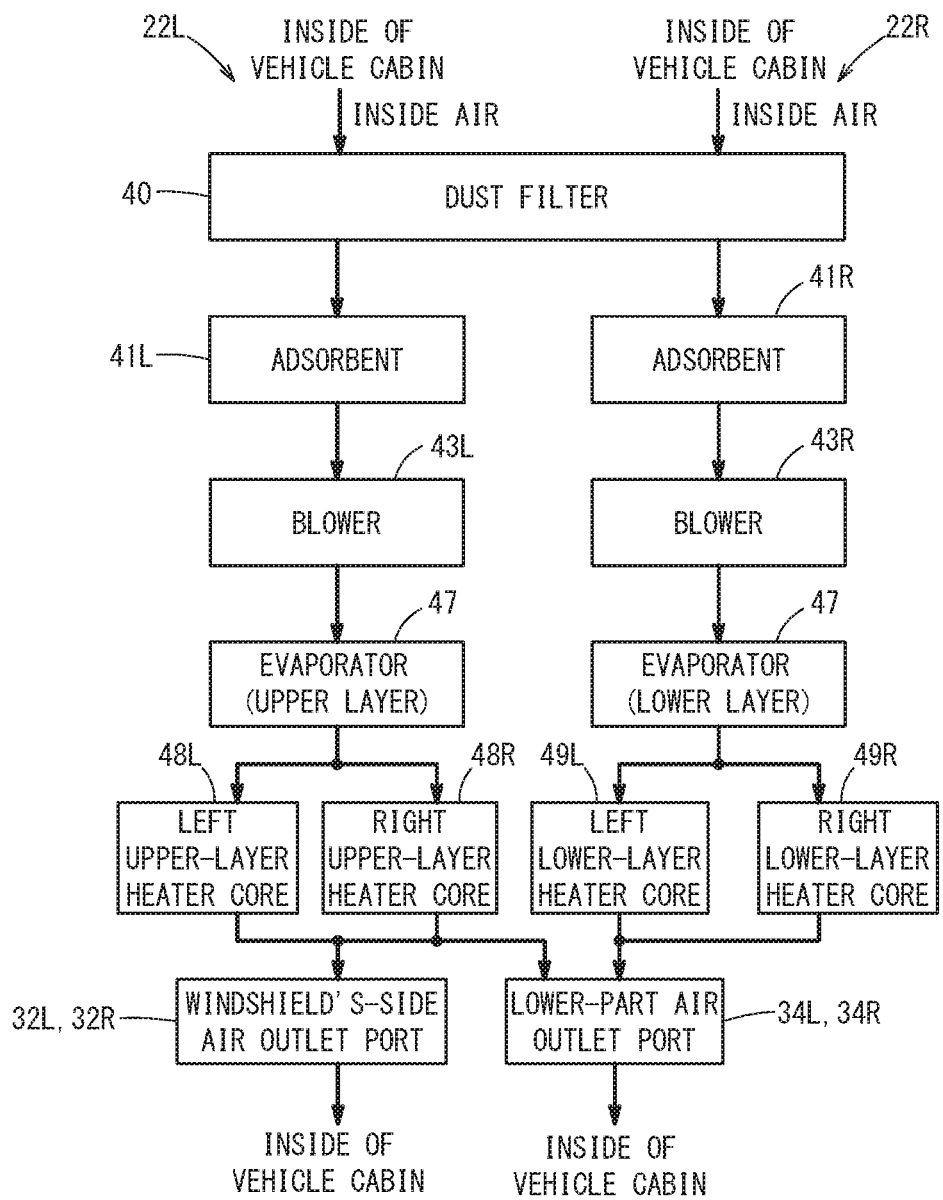

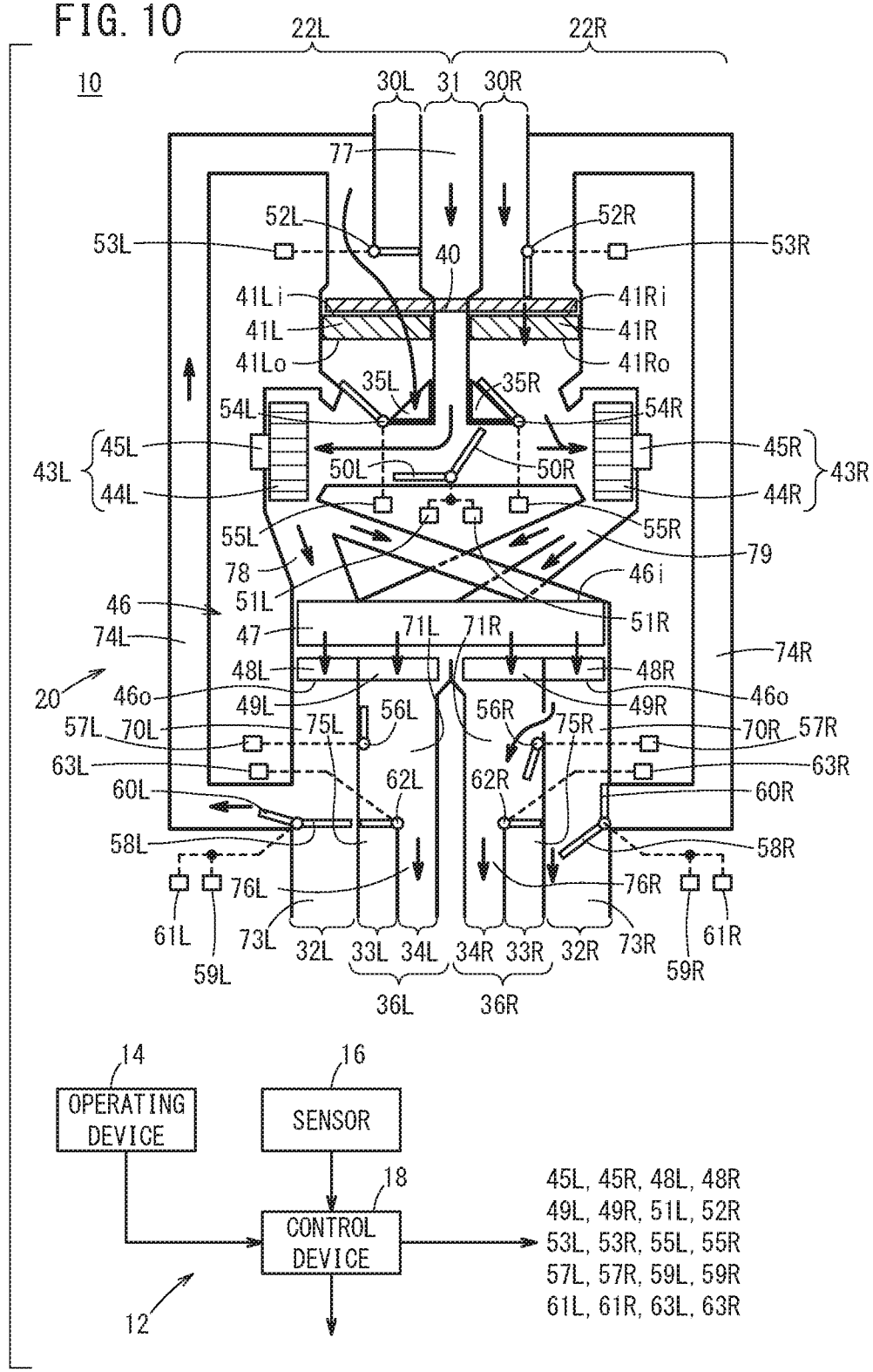

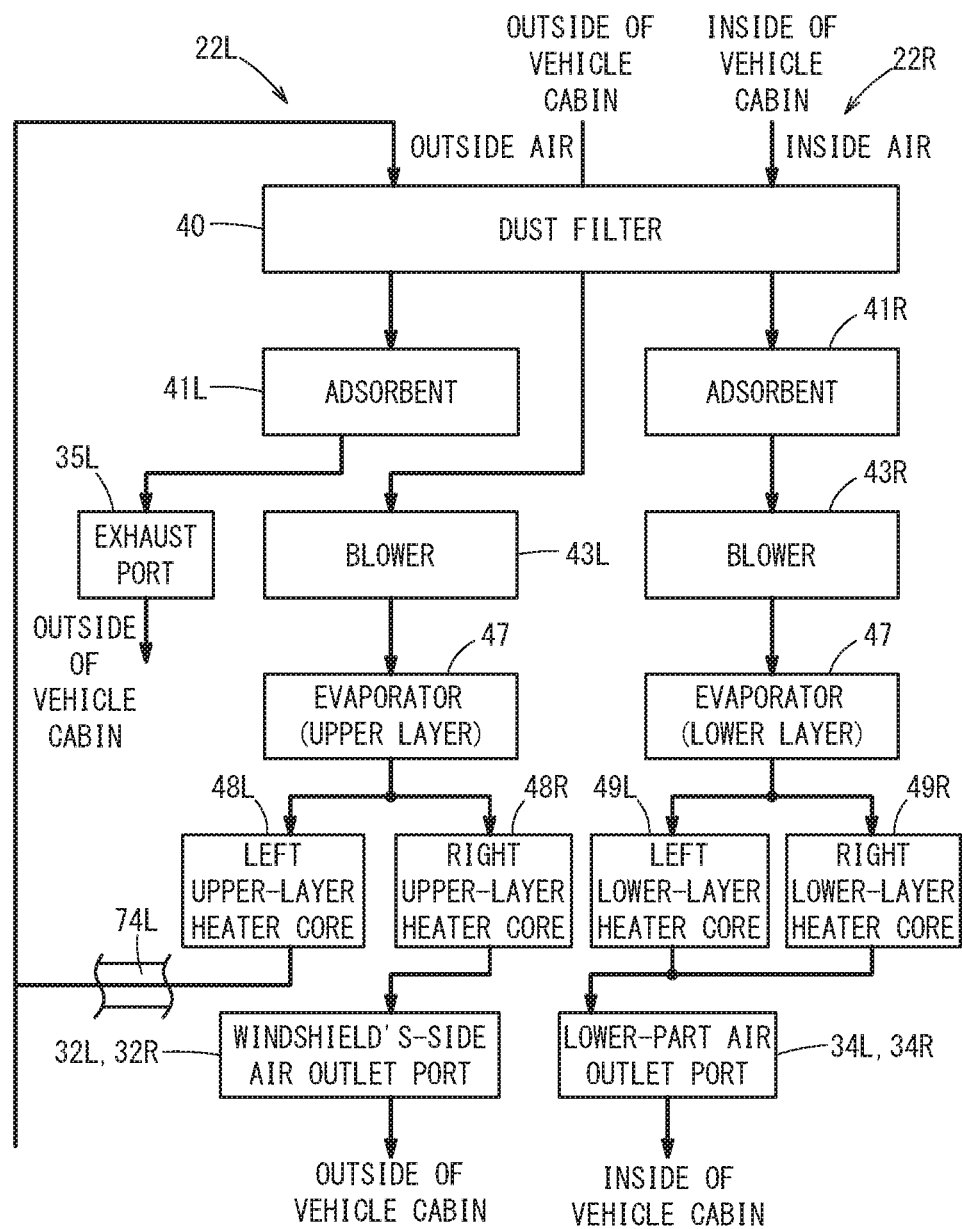

VEHICLE AIR-CONDITIONING DEVICE

CROSS-REFERENCE TO RELATED APPLICATION

This application is based upon and claims the benefit of priority from Japanese Patent Application No. 2017-186632 filed on Sep. 27, 2017, the contents of which are incorporated herein by reference.

BACKGROUND OF THE INVENTION

Field of the Invention

The present invention relates to a vehicle air-conditioning device that adsorbs water contained in the air with an adsorbent at the time of inside-air circulation.

Description of the Related Art

In Japanese Patent No. 4997218, a vehicle air-conditioning device is described, the vehicle air-conditioning device sucking in the air inside a vehicle cabin, adsorbing water contained in the sucked-in air with an adsorbent, and regulating the temperature of the air that has passed through the adsorbent by a temperature regulating device and blowing the air into the vehicle cabin at the time of inside-air circulation. By using the adsorbent, the air inside the vehicle cabin is dehumidified, which allows a vehicle occupant to comfortably stay in the vehicle.

When the adsorbent is continuously used, the adsorbent contains a large amount of water, which reduces adsorption efficiency. This makes it necessary to perform treatment to remove water by drying the adsorbent (which is called drying treatment or regeneration treatment). The vehicle air-conditioning device of Japanese Patent No. 4997218 dries the adsorbent by blowing part of the air warmed by the temperature regulating device toward the feet of the vehicle occupant and guiding part of the air to the adsorbent at the time of regeneration treatment of the adsorbent.

SUMMARY OF THE INVENTION

Since the vehicle air-conditioning device of Japanese Patent No. 4997218 regenerates the adsorbent by using part of the air warmed by the temperature regulating device, heating performance is reduced and the heating energy of a heater is increased.

The present invention has been made in view of such a problem and an object thereof is to provide a vehicle air-conditioning device that can reduce the heating energy of a heater without degrading heating performance.

The present invention is a vehicle air-conditioning device including: an inside-air inlet port configured to suck in air inside a vehicle cabin; an outside-air inlet port configured to suck in air outside the vehicle cabin; an adsorbent configured to adsorb water contained in the air, including an adsorbent inflow section into which the air sucked in through the inside-air inlet port flows and an adsorbent outflow section from which the air flows; a temperature regulating device configured to regulate a temperature of the air, including a temperature regulating device inflow section into which the air flowed from the adsorbent or the air sucked in through the outside-air inlet port flows, and a temperature regulating device outflow section from which the air flows; a windshield's-side air outlet port configured to blow the air flowed from the temperature regulating device toward a windshield in the vehicle cabin; and another air outlet port configured to blow the air flowed from the temperature regulating device toward an area other than the windshield in the vehicle cabin. The vehicle air-conditioning device is configured to guide the air warmed by the temperature regulating device to the adsorbent by interrupting communication between the temperature regulating device outflow section and the windshield's-side air outlet port and making the temperature regulating device outflow section and the adsorbent inflow section communicate with each other.

With the above-described configuration, by interrupting the communication between the temperature regulating device outflow section and the windshield's-side air outlet port and making the temperature regulating device outflow section and the adsorbent inflow section communicate with each other, the air warmed by the temperature regulating device is preferentially guided to the adsorbent, which makes it possible to make the most of the air warmed by the temperature regulating device for regeneration of the adsorbent, and reduce the heating energy of a heater without degrading heating performance.

The present invention is a vehicle air-conditioning device including: an inside-air inlet port configured to suck in air inside a vehicle cabin; an outside-air inlet port configured to suck in air outside the vehicle cabin; an adsorbent configured to adsorb water contained in the air, including an adsorbent inflow section into which the air sucked in through the inside-air inlet port flows and an adsorbent outflow section from which the air flows; a temperature regulating device configured to regulate a temperature of the air, including a temperature regulating device inflow section into which the air flowed from the adsorbent or the air sucked in through the outside-air inlet port flows, and a temperature regulating device outflow section from which the air flows; a windshield's-side air outlet port configured to blow the air flowed from the temperature regulating device toward a windshield in the vehicle cabin; and another air outlet port configured to blow the air flowed from the temperature regulating device toward an area other than the windshield in the vehicle cabin. A first flow channel is connected to the temperature regulating device outflow section of the temperature regulating device, and a second flow channel is connected to the first flow channel. A windshield's-side flow channel and an adsorbent's-side flow channel are formed in the first flow channel, downstream of a connection point of the first flow channel and the second flow channel. The windshield's-side flow channel is configured to guide the air to the windshield's-side air outlet port and the adsorbent's-side flow channel is configured to guide the air to the adsorbent inflow section. Another flow channel is formed in the second flow channel, and configured to guide the air to the other air outlet port. A first door is provided between the first flow channel and the second flow channel, and configured to switch between a state in which the first flow channel and the second flow channel communicate with each other and a state in which the communication between the first flow channel and the second flow channel is interrupted. A second door is provided in the windshield's-side flow channel, and configured to switch between a state in which the temperature regulating device outflow section and the windshield's-side air outlet port communicate with each other and a state in which the communication between the temperature regulating device outflow section and the windshield's-side air outlet port is interrupted. A third door is provided in the adsorbent's-side flow channel, and configured to switch between a state in which the temperature regulating device outflow section and the adsorbent inflow section communicate with each other and a state in which the communication between the temperature regulating device outflow section and the adsorbent inflow section is interrupted. At a time of regeneration treatment of the adsorbent, the air warmed by the temperature regulating device is guided to the adsorbent, by placing the first door and the second door in the state of interruption, and placing the third door in the state of communication.

With the above-described configuration, by interrupting the communication between the first flow channel and the second flow channel, interrupting the communication between the temperature regulating device outflow section and the windshield's-side air outlet port, and making the temperature regulating device outflow section and the adsorbent inflow section communicate with each other, the air warmed by the temperature regulating device is preferentially guided to the adsorbent, which makes it possible to make the most of the air warmed by the temperature regulating device for regeneration of the adsorbent, and reduce the heating energy of the heater without degrading heating performance.

In the vehicle air-conditioning device according to the present invention, the adsorbent may include two adsorbents, the vehicle air-conditioning device may concurrently form an outside-air introduction circuit configured to guide the air sucked in through the outside-air inlet port to the temperature regulating device, and an inside-air circulation circuit configured to guide the air sucked in through the inside-air inlet port to the temperature regulating device, and at a time of regeneration treatment of one of the two adsorbents, the vehicle air-conditioning device may be configured to suck in air required for regeneration through the outside-air inlet port, warm the sucked-in air by the temperature regulating device, guide the warmed air to the adsorbent inflow section of the one adsorbent, and exhaust the air flowing from the adsorbent outflow section of the one adsorbent.

With the above-described configuration, since the air required for regeneration treatment can be sucked in from the outside of the vehicle cabin and the air inside the vehicle cabin can be circulated by inside-air circulation, it is possible to perform regeneration treatment of the adsorbent without affecting air conditioning in the vehicle cabin.

The vehicle air-conditioning device according to the present invention may further include an outside-air introduction flow channel configured to guide the air sucked in through the outside-air inlet port to a space between the adsorbent outflow section and the temperature regulating device inflow section, the two adsorbents may be disposed separately from each other in a vehicle-width direction, and a position of the outside-air introduction flow channel in the vehicle-width direction may be a position between the two adsorbents in the vehicle-width direction.

With the above-described configuration, the outside-air introduction circuit including the one adsorbent and the outside-air introduction circuit including the other adsorbent can share the outside-air introduction flow channel. This simplifies the structure.

In the vehicle air-conditioning device according to the present invention, the adsorbent may be disposed in a position closer to a front of a vehicle than the windshield's-side air outlet port.

With the above-described configuration, it is possible to use part of the windshield's-side flow channel that guides warm air to the windshield's-side air outlet port from the temperature regulating device for defogging/defrosting, as part of the adsorbent's-side flow channel. This simplifies the structure.

The vehicle air-conditioning device according to the present invention may further include a dust filter between the inside-air inlet port and the adsorbent inflow section.

With the above-described configuration, since dirt and dust can be captured on the upstream side of the adsorbent, it is possible to keep the adsorbent clean and increase maintenance intervals of the vehicle air-conditioning device.

In the vehicle air-conditioning device according to the present invention, two blowers configured to generate a flow of air may be disposed separately from each other in a vehicle-width direction, and positions of the two adsorbents in the vehicle-width direction may be positions between the two blowers in the vehicle-width direction.

With the above-described configuration, it is possible to simplify the structure of a device including the two adsorbents and the two blowers.

According to the present invention, it is possible to make the most of the air warmed by the temperature regulating device for regeneration of the adsorbent, and regenerate (dry) the adsorbent efficiently.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a diagram depicting the position of each door which is observed when the indoor temperature is stabilized in the vent mode;

FIG. 7 is a diagram depicting the flow of air which is observed when the indoor temperature is stabilized in the vent mode;

FIG. 8 is a diagram depicting the position of each door which is observed when warm-up is performed in a heat mode;

FIG. 9 is a diagram depicting the flow of air which is observed when warm-up is performed in the heat mode;

FIG. 10 is a diagram depicting the position of each door which is observed when the indoor temperature is stabilized in the heat mode; and FIG. 11 is a diagram depicting the flow of air which is observed when the indoor temperature is stabilized in the heat mode.

DESCRIPTION OF THE PREFERRED EMBODIMENTS

Hereinafter, a preferred embodiment of a vehicle air-conditioning device according to the present invention will be described in detail with reference to the accompanying drawings. A vehicle air-conditioning device according to the present embodiment is provided in an electric vehicle equipped with a traction motor. Examples of the electric vehicle include an electric automobile, a hybrid automobile, a plug-in hybrid automobile, and a fuel cell automobile. The vehicle air-conditioning device according to the present embodiment can also be provided in a vehicle equipped with an internal combustion engine.

1. System Configuration of Vehicle Air-Conditioning Device 10

Figure 1:
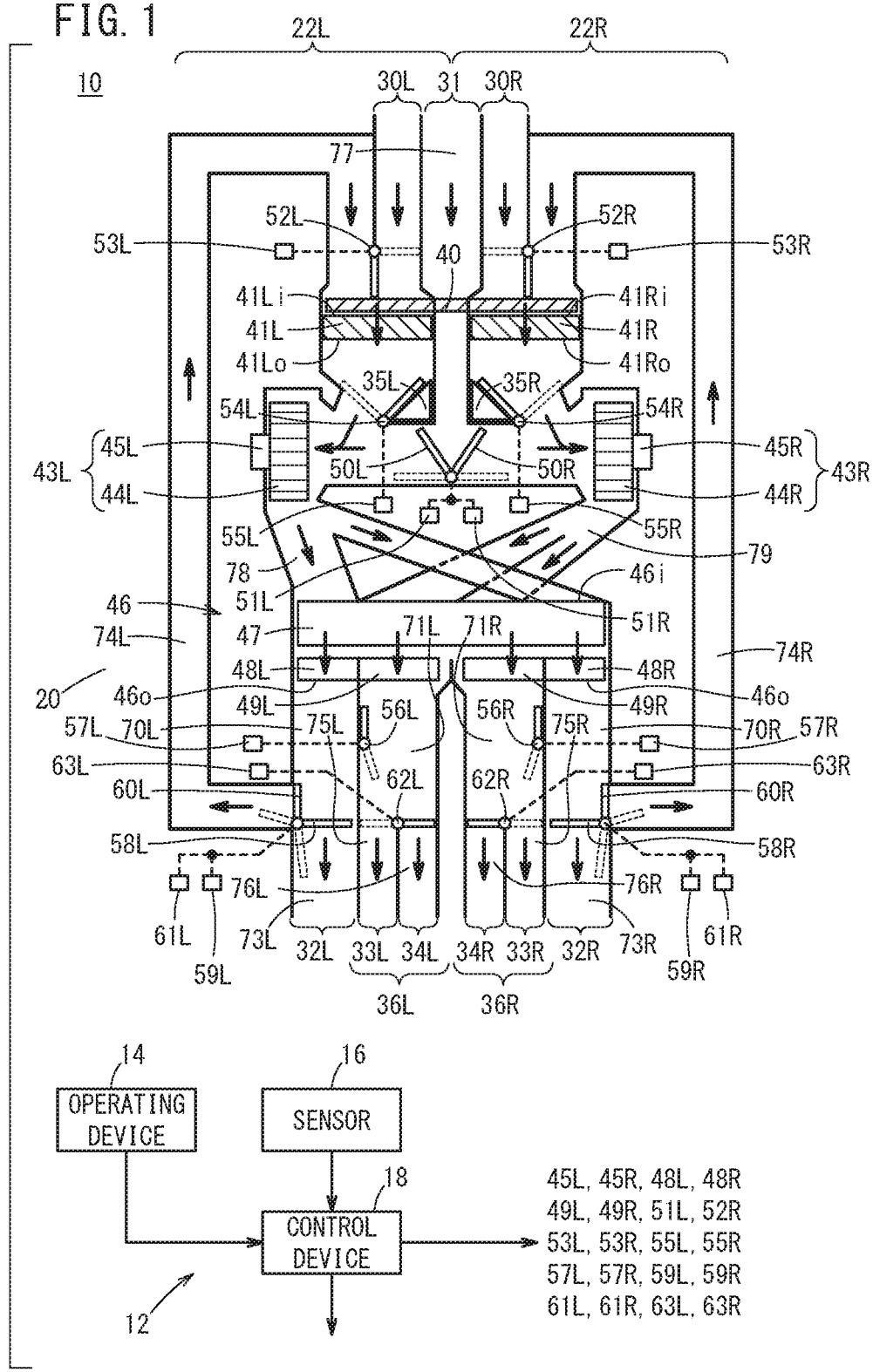
FIG. 1 is a configuration diagram of a vehicle air-conditioning device.

The configuration of a vehicle air-conditioning device 10 according to the present embodiment will be described with reference to FIGS. 1 to 3. As depicted in FIG. 1, the vehicle air-conditioning device 10 includes an air-conditioning operation section 20 that sucks in air, cools or heats the air, and blows the air, and an air-conditioning control section 12 that controls the operations of actuators provided in the air-conditioning operation section 20.

Figure 5:
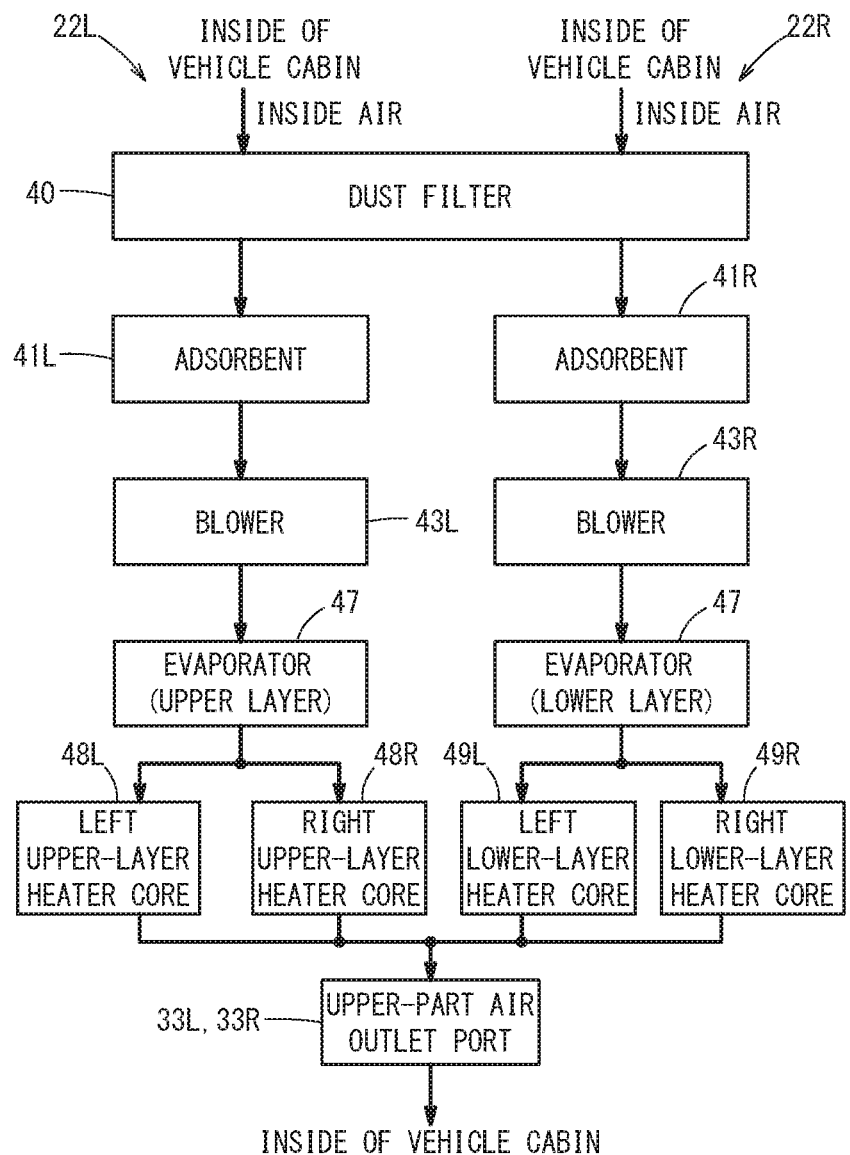
FIG. 5 is a diagram depicting the flow of air which is observed when quick cooling and heating is performed in the vent mode.

The air-conditioning control section 12 includes an operating device 14, a sensor 16, and a control device 18. The operating device 14 is an input interface used by a vehicle occupant to input ON/OFF information and setting information (a set temperature and an operation mode) and is provided in a dashboard or the like in a vehicle cabin. The sensor 16 detects the temperature, humidity, and carbon dioxide inside the vehicle cabin. The control device 18 is configured with an ECU and includes an arithmetical unit such as a processor and a storage device such as a ROM and RAM. As a result of the arithmetic unit executing a program stored in the storage device, management of air conditioning in the vehicle cabin or a series of processing depicted in FIG. 5 is performed. Moreover, the control device 18 has drivers of the actuators and supplies a drive current to the actuators.

Figure 2:
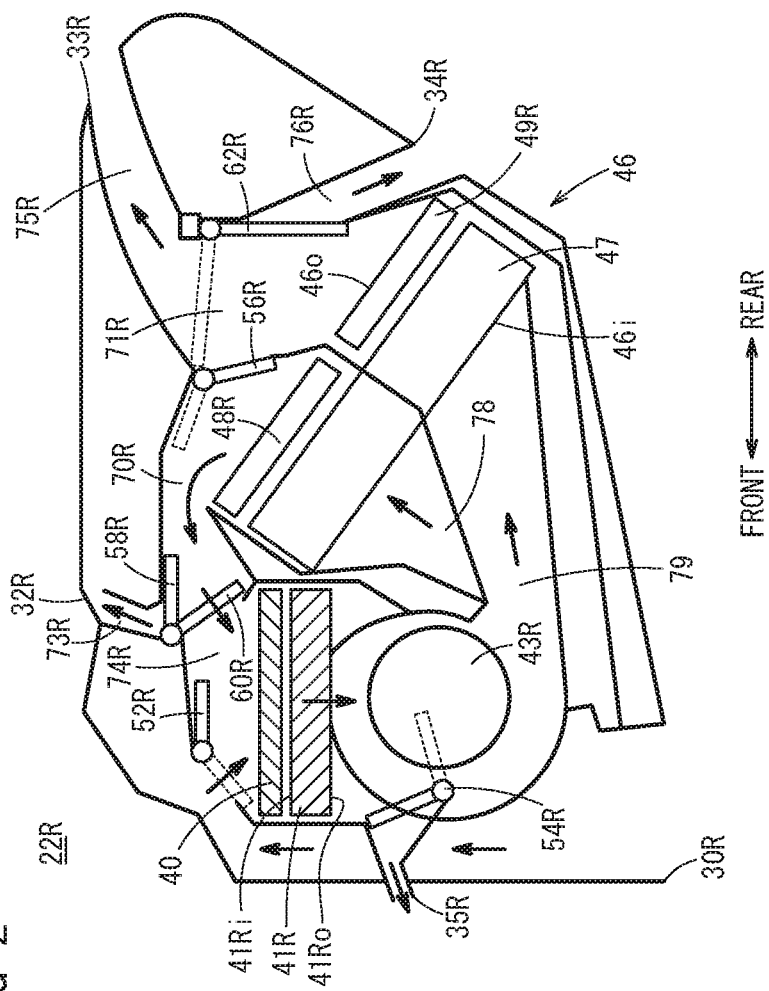
FIG. 2 is a diagram depicting the placement of parts of a right-side operation section disposed on the right side of a vehicle.
Figure 3:
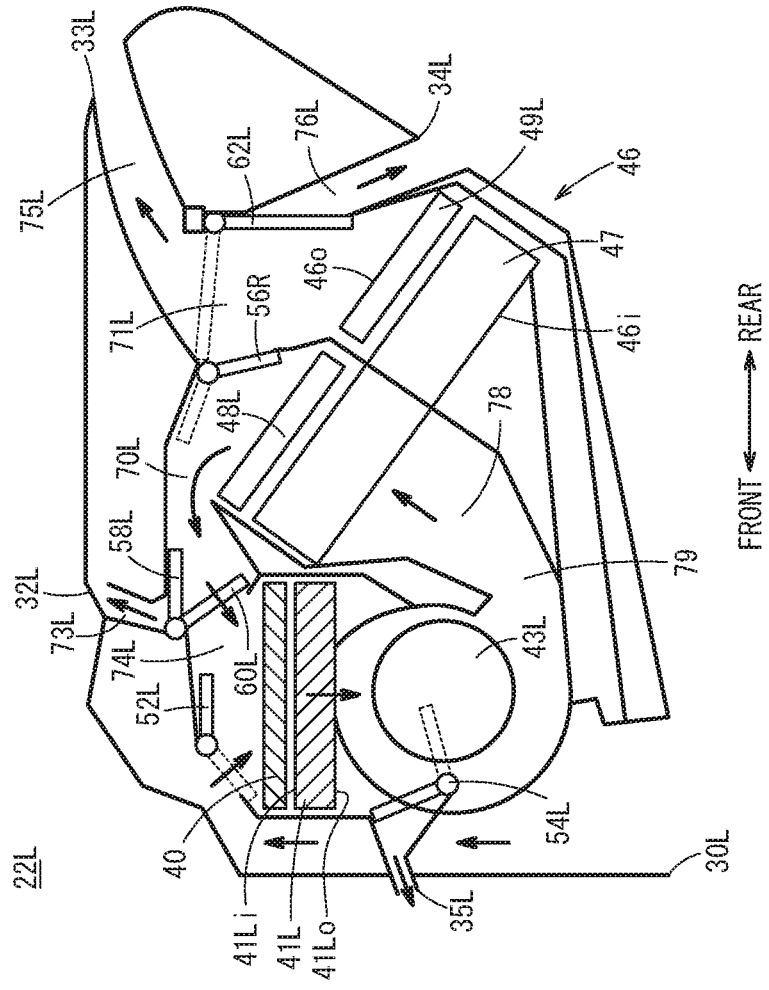
FIG. 3 is a diagram depicting the placement of parts of a left-side operation section disposed on the left side of the vehicle.

The air-conditioning operation section 20 includes a right-side operation section 22R depicted in FIG. 2 and a left-side operation section 22L depicted in FIG. 3. The left-side operation section 22L is provided as a whole on the left side in a vehicle-width direction compared to the right-side operation section 22R. The right-side operation section 22R is provided as a whole on the right side in the vehicle-width direction compared to the left-side operation section 22L. The components and the connection relationship therebetween of the left-side operation section 22L and the right-side operation section 22R are substantially the same. Thus, in the present specification, the components and the connection relationship therebetween of the left-side operation section 22L will be described, and the description of the components and the connection relationship therebetween of the right-side operation section 22R will be basically omitted. However, a portion of the right-side operation section 22R and a portion of the left-side operation section 22L, which are different from each other, will be described as appropriate. In the present specification and the drawings, a part of the left-side operation section 22L and a part of the right-side operation section 22R, which have the same function, will be identified with the same numeric character and the parts are differentiated from each other by adding L (left) and R (right) to the numerals as suffixes. In the present specification, a description about the left-side operation section 22L becomes a description about the right-side operation section 22R by replacing the suffix of the character with R.

The left-side operation section 22L has an inside-air inlet port 30L that is provided inside the vehicle cabin and sucks in the air inside the vehicle cabin (hereinafter also referred to as the inside air) and an outside-air inlet port 31 (which is not depicted in FIG. 3) that is provided outside the vehicle cabin and sucks in the air outside the vehicle cabin (hereinafter also referred to as the outside air). The outside-air inlet port 31 is shared by the left-side operation section 22L and the right-side operation section 22R. The inside-air inlet port 30L and an inside-air inlet port 30R may be one inside-air inlet port; in that case, a flow channel is provided and branches off into two left and right flow channels on a downstream side.

The left-side operation section 22L has a windshield's-side air outlet port 32L, an upper-part air outlet port 33L, and a lower-part air outlet port 34L which are provided inside the vehicle cabin, and has an exhaust port 35L which is provided outside the vehicle cabin. The windshield's-side air outlet port 32L is provided between a lower part of a windshield and the dashboard in the vehicle cabin and blows the air toward the windshield. The upper-part air outlet port 33L is provided in the dashboard or the like in the vehicle cabin and blows the air toward the upper part of the vehicle cabin. The lower-part air outlet port 34L is provided near the bottom in the vehicle cabin and blows the air toward the lower part of the vehicle cabin. The windshield's-side air outlet port 32L is mainly used when the left-side operation section 22L operates as a defroster. In the present specification, the upper-part air outlet port 33L and the lower-part air outlet port 34L, which blow the air into the vehicle cabin and are the air outlet ports other than the windshield's-side air outlet port 32L, will be referred to as other air outlet ports 36L.

In the left-side operation section 22L, flow channels of air are formed from the inside-air inlet port 30L and the outside-air inlet port 31, to the windshield's-side air outlet port 32L, the other air outlet ports 36L, and the exhaust port 35L. In the flow channels, a dust filter 40, an adsorbent 41L, a blower 43L, and a temperature regulating device 46 are provided.

The dust filter 40 is formed of nonwoven filter medium, for example, and allows air to pass therethrough and captures dirt and dust in the air. The dust filter 40 is provided in the flow channel on the downstream side of the inside-air inlet port 30L and the outside-air inlet port 31.

The adsorbent 41L is formed of zeolite, for example, and allows air to pass therethrough and adsorbs and captures water contained in the air. An upstream area of the adsorbent 41L into which the air flows is referred to as an adsorbent inflow section 41Li and a downstream area from which the air flows is referred to as an adsorbent outflow section 41Lo. The adsorbent 41L is provided in the flow channel on the downstream side of the dust filter 40. As depicted in FIG. 3, the adsorbent 41L is located in the vehicle on a side closer to the front than the windshield's-side air outlet port 32L, which will be described later. Moreover, as depicted in FIG. 1 in a simplified fashion, the positions of the adsorbent 41L and an adsorbent 41R in the vehicle-width direction are positions between the blowers 43L, 43R in the vehicle-width direction.

The blower 43L has a blower fan 44L and a blower motor 45L. As a result of the blower motor 45L rotating the blower fan 44L, the air flows from the air inlet ports of the inside air and the outside air to the air outlet ports. The blower motor 45L operates by the drive current output from the control device 18.

The temperature regulating device 46 regulates the temperature of the inside air that has passed through the adsorbent 41L or the outside air sucked in through the outside-air inlet port 31. The temperature regulating device 46 has an evaporator 47 on an upstream side and has, on a downstream side, a plurality of heater cores, in this case, upper-layer heater cores 48L, 48R and lower-layer heater cores 49L, 49R. An upper-layer flow channel 78 located downstream of the blower 43L is formed in such a way that the air flows into the left and right of an upper layer of the temperature regulating device 46. A lower-layer flow channel 79 located downstream of the blower 43R is formed in such a way that the air flows into the left and right of a lower layer of the temperature regulating device 46. The upper-layer heater core 48L is disposed above the lower-layer heater core 49L, and the upper-layer heater core 48R is disposed above the lower-layer heater core 49R. In FIG. 1, for easy understanding of the drawing, the lower-layer heater core 49L is depicted on the right side of the upper-layer heater core 48L on the sheet of paper, and the lower-layer heater core 49R is depicted on the left side of the upper-layer heater core 48R on the sheet of paper. The upper-layer heater cores 48L, 48R and the lower-layer heater cores 49L, 49R may be heaters with a heating wire or may be radiators with flow channels of heating medium heated to high temperatures by a compressor or the like. The operations of the upper-layer heater cores 48L, 48R and the lower-layer heater cores 49L, 49R are controlled by the control device 18.

An upstream area of the temperature regulating device 46 into which the air flows is referred to as a temperature regulating device inflow section 46$i$, and downstream areas from which the air flows are referred to as temperature regulating device outflow sections 46$o$. More specifically, an upstream area of the evaporator 47 is referred to as the temperature regulating device inflow section 46$i$. Moreover, a downstream area of the upper-layer heater cores 48L, 48R and a downstream area of the lower-layer heater cores 49L, 49R are referred to as the temperature regulating device outflow sections 46$o$.

In the left-side operation section 22L, flow channels of air are formed, and, in the flow channels, a plurality of doors that switch the direction in which the air flows are provided. In FIG. 1, one movement limit position of each door is indicated by a solid line and the other movement limit position is indicated by a dashed line.

An outside-air introduction flow channel 77 is formed downstream of the outside-air inlet port 31. The outside-air introduction flow channel 77 guides the air sucked in through the outside-air inlet port 31 to a space between the adsorbent outflow section 41Lo and the temperature regulating device inflow section 46$i$, specifically, a space between the adsorbent 41L and the blower 43L. The outside-air introduction flow channel 77 is formed so as to pass between the adsorbent 41L and the adsorbent 41R which are disposed so as to be separated from each other in the vehicle-width direction. In the outside-air introduction flow channel 77, a first intake door 50L (which is not depicted in FIG. 3) is provided. The first intake door 50L is driven by a first motor 51L and switches between a state in which the outside-air inlet port 31 and the blower 43L communicate with each other and a state in which communication between the outside-air inlet port 31 and the blower 43L is interrupted. Between the inside-air inlet port 30L and the dust filter 40, a second intake door 52L is provided. The second intake door 52L is driven by a second motor 53L and switches between a state in which the inside-air inlet port 30L and the dust filter 40 communicate with each other and a state in which communication between the inside-air inlet port 30L and the dust filter 40 is interrupted.

Between the adsorbent 41L and the blower 43L and between the adsorbent 41L and the exhaust port 35L, an exhaust switching door 54L is provided. The exhaust switching door 54L is driven by a third motor 55L, and switches between a state in which the adsorbent 41L and the blower 43L communicate with each other and a state in which communication between the adsorbent 41L and the blower 43L is interrupted, and switches between a state in which the adsorbent 41L and the exhaust port 35L communicate with each other and a state in which communication between the adsorbent 41L and the exhaust port 35L is interrupted. When the adsorbent 41L and the blower 43L communicate with each other, the communication between the adsorbent 41L and the exhaust port 35L is interrupted. On the other hand, when the adsorbent 41L and the exhaust port 35L communicate with each other, the communication between the adsorbent 41L and the blower 43L is interrupted.

A first flow channel 70L is formed downstream of the upper-layer heater core 48L, and a second flow channel 71L is formed downstream of the lower-layer heater core 49L. Part of the first flow channel 70L and part of the second flow channel 71L are connected to each other. At a connection point between the first flow channel 70L and the second flow channel 71L, a first door 56L is provided. The first door 56L is driven by a fourth motor 57L and switches between a state in which the first flow channel 70L and the second flow channel 71L communicate with each other and a state in which communication between the first flow channel 70L and the second flow channel 71L is interrupted.

A windshield's-side flow channel 73L that guides the air to the windshield's-side air outlet port 32L and an adsorbent's-side flow channel 74L that guides the air to the dust filter 40 and the adsorbent inflow section 41Li are formed downstream of the first door 56L located at the connection point of the first flow channel 70L with the second flow channel 71L. In the windshield's-side flow channel 73L, a second door 58L is provided. The second door 58L is driven by a fifth motor 59L and switches between a state in which the temperature regulating device outflow section 46$o$ and the windshield's-side air outlet port 32L communicate with each other and a state in which communication between the temperature regulating device outflow section 46$o$ and the windshield's-side air outlet port 32L is interrupted. In the adsorbent's-side flow channel 74L, a third door 60L is provided. The third door 60L is driven by a sixth motor 61L and switches between a state in which the temperature regulating device outflow section 46$o$ and the dust filter 40 and the adsorbent inflow section 41Li communicate with each other and a state in which communication between the temperature regulating device outflow section 46$o$ and the dust filter 40 and the adsorbent inflow section 41Li is interrupted.

An upper-part flow channel 75L that guides the air to the upper-part air outlet port 33L and a lower-part flow channel 76L that guides the air to the lower-part air outlet port 34L are formed downstream of the first door 56L located at the connection point of the second flow channel 71L with the first flow channel 70L. At a branch point of the upper-part flow channel 75L and the lower-part flow channel 76L, a fourth door 62L is provided. The fourth door 62L is driven by a seventh motor 63L, and switches between a state in which the temperature regulating device outflow section 46$o$ and the upper-part air outlet port 33L communicate with each other and a state in which the communication between the temperature regulating device outflow section 46$o$ and the upper-part air outlet port 33L is interrupted and switches between a state in which the temperature regulating device outflow section 46$o$ and the lower-part air outlet port 34L communicate with each other and a state in which communication between the temperature regulating device outflow section 46o and the lower-part air outlet port 34L is interrupted.

The vehicle air-conditioning device 10 is configured as described above. The vehicle air-conditioning device 10 can form an outside-air introduction circuit by using the left-side operation section 22L and, at the same time, form an inside-air circulation circuit by using the right-side operation section 22R. Conversely, the air-conditioning operation section 20 can also form the outside-air introduction circuit by using the right-side operation section 22R and, at the same time, form the inside-air circulation circuit by using the left-side operation section 22L. With the outside-air introduction circuit, the air sucked in through the outside-air inlet port 31 is guided to the temperature regulating device 46. With the inside-air circulation circuit, the air sucked in through the inside-air inlet ports 30L, 30R is guided to the temperature regulating device 46.

2. Operation of Vehicle Air-Conditioning Device 10

The control device 18 starts operating when an operating switch of the operating device 14 is switched from OFF to ON and stops operating when the operating switch is switched from ON to OFF. Moreover, the control device 18 controls the actuators in accordance with an operation mode set by the operating device 14 and controls the actuators so that a difference between a set temperature set by the operating device 14 and the temperature detected by the sensor 16 is within a predetermined temperature range.

When the vehicle air-conditioning device 10 is continuously operated for inside-air circulation, adsorption efficiency is reduced because the adsorbent 41L contains a large amount of water. For this reason, the vehicle air-conditioning device 10 performs regeneration treatment of the adsorbent 41L after elapse of a predetermined time from the start of operation for inside-air circulation.

3. Open/Close Control of Each Door in Each Operation Mode and the Flow of Air

A predetermined operation mode is set in the vehicle air-conditioning device 10, and the vehicle air-conditioning device 10 operates in an operation mode specified by the operating device 14. Hereinafter, an operation in each operation mode, specifically, operation control of each door and the flow of air will be described.

In the present embodiment, operation modes, for example, a vent mode and a heat mode are set. The vent mode is an operation mode in which the air inside the vehicle cabin is regulated by blowing air from the upper-part air outlet ports 33L, 33R, and is mainly used at the time of cooling. The heat mode is an operation mode in which the air inside the vehicle cabin is regulated by blowing air from the lower-part air outlet ports 34L, 34R, and is mainly used at the time of heating.

The regeneration treatment of the adsorbents 41L, 41R is performed in sections [3.2], [3.4], which will be described later. Except for a period in which regeneration of the adsorbents 41L, 41R is performed, the doors of the left-side operation section 22L and the doors of the right-side operation section 22R are subjected to the same operation control. Thus, in the explanation given in sections [3.1], [3.3], which will be described later, operation control of each door of the left-side operation section 22L and the flow of air will be described, and the description of operation control of each door of the right-side operation section 22R and the flow of air will be omitted.

[3.1. Vent Mode (at the Time of Quick Cooling and Heating)]

The position control of each door at the time of quick cooling and heating in the vent mode will be described with reference to FIG. 4, and the flow of air in this case will be described with reference to FIG. 5.

When a vehicle occupant turns on an air-conditioning switch of the operating device 14 to set it to the vent mode, the control device 18 outputs the drive current in accordance with the vent mode to the first to seventh motors 51L to 63L.

Figure 4:
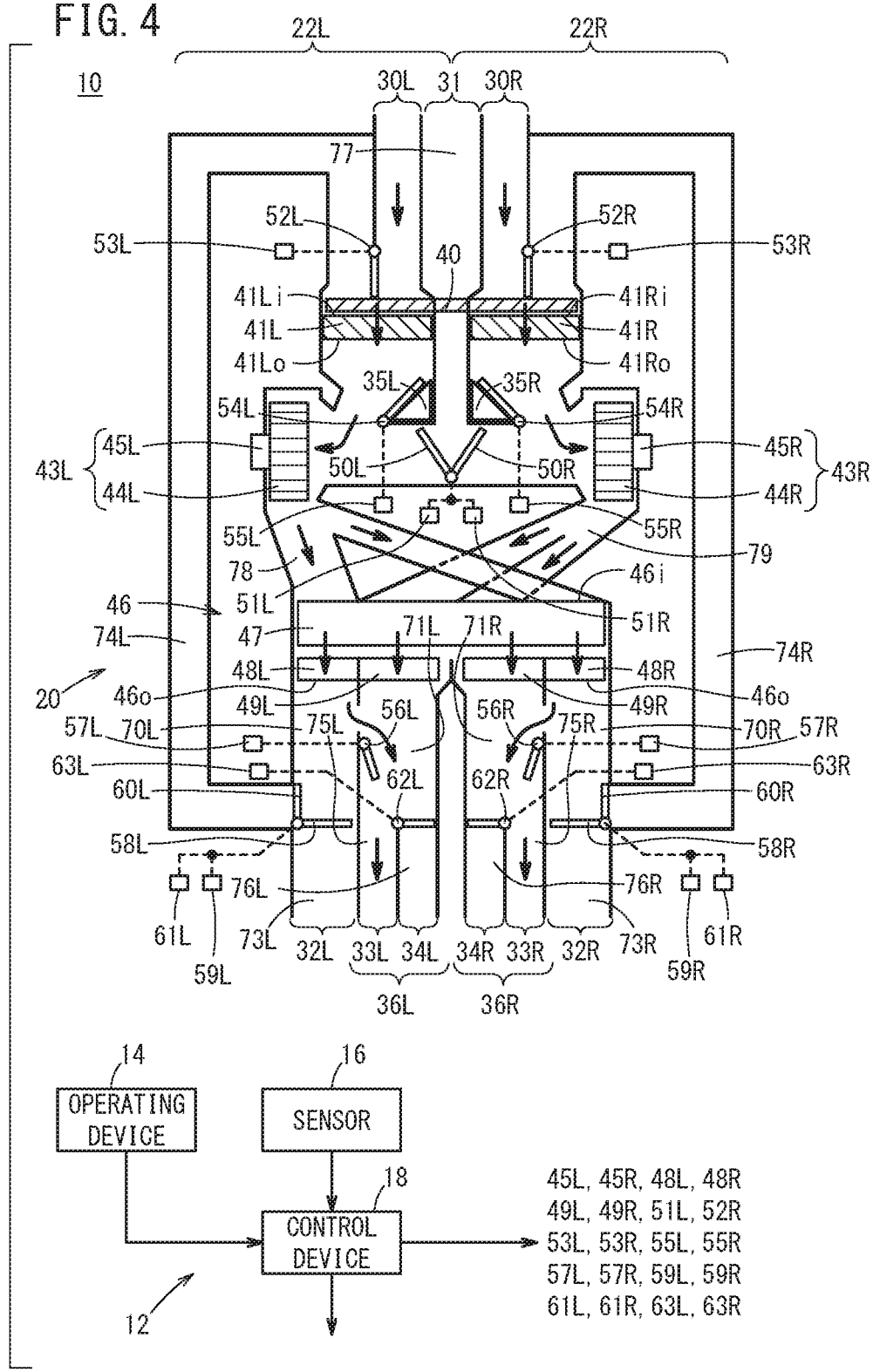
FIG. 4 is a diagram depicting the position of each door which is observed when quick cooling and heating is performed in a vent mode.

As depicted in FIG. 4, the first motor 51L drives the first intake door 50L. The first intake door 50L interrupts the communication between the outside-air inlet port 31 and the blower 43L. The second motor 53L drives the second intake door 52L. The second intake door 52L opens the flow channel between the inside-air inlet port 30L and the dust filter 40. At this time, the inside-air inlet port 30L and the dust filter 40 communicate with each other. The third motor 55L drives the exhaust switching door 54L. The exhaust switching door 54L opens the flow channel between the adsorbent 41L and the blower 43L and interrupts the communication between the adsorbent 41L and the exhaust port 35L. At this time, the adsorbent 41L and the blower 43L communicate with each other. With this placement of the first intake door 50L, the second intake door 52L, and the exhaust switching door 54L, the inside-air circulation circuit is formed.

The fourth motor 57L drives the first door 56L. The first door 56L opens the first flow channel 70L and the second flow channel 71L. At this time, the first flow channel 70L and the second flow channel 71L communicate with each other. The fifth motor 59L drives the second door 58L. The second door 58L blocks the windshield's-side flow channel 73L between the upper-layer heater core 48L and the windshield's-side air outlet port 32L and between the lower-layer heater core 49L and the windshield's-side air outlet port 32L. The sixth motor 61L drives the third door 60L. The third door 60L blocks the adsorbent's-side flow channel 74L between the upper-layer heater core 48L and the adsorbent 41L and between the lower-layer heater core 49L and the adsorbent 41L.

The seventh motor 63L drives the fourth door 62L. The fourth door 62L opens the upper-part flow channel 75L between the upper-layer heater core 48L and the upper-part air outlet port 33L and between the lower-layer heater core 49L and the upper-part air outlet port 33L, and blocks the lower-part flow channel 76L between the upper-layer heater core 48L and the lower-part air outlet port 34L and between the lower-layer heater core 49L and the lower-part air outlet port 34L. At this time, the upper-layer heater core 48L and the upper-part air outlet port 33L communicate with each other and the lower-layer heater core 49L and the upper-part air outlet port 33L communicate with each other.

As depicted in FIG. 5, the left-side operation section 22L circulates the air by inside-air circulation. The inside air sucked in through the inside-air inlet port 30L sequentially passes through the dust filter 40, the adsorbent 41L, and the blower 43L and is guided to an upper layer of the evaporator 47. The inside air that has passed through the upper layer of the evaporator 47 and the left upper-layer heater core 48L is blown out through the upper-part air outlet port 33L. Moreover, the inside air that has passed through the upper layer of the evaporator 47 and the right upper-layer heater core 48R is blown out through the upper-part air outlet port 33R.

[3.2. Vent Mode (When the Ambient Temperature is Stabilized)]

The position control of each door when the ambient temperature is stabilized in the vent mode will be described with reference to FIG. 6, and the flow of air in this case will be described with reference to FIG. 7. The following operation is performed when a regeneration condition is met in the operation mode of [3.1] described above.

When the ambient temperature is stabilized by the vent mode, the control device 18 outputs the drive current in accordance with the regeneration treatment to the first to seventh motors 51L to 63L. Moreover, the control device 18 operates the upper-layer heater core 48L if the upper-layer heater core 48L is not operating.

As depicted in FIG. 6, the first motor 51L drives the first intake door 50L. The first intake door 50L opens the flow channel between the outside-air inlet port 31 and the blower 43L. At this time, the outside-air inlet port 31 and the blower 43L communicate with each other. The second motor 53L drives the second intake door 52L. The second intake door 52L interrupts the communication between the inside-air inlet port 30L and the dust filter 40. The third motor 55L drives the exhaust switching door 54L. The exhaust switching door 54L interrupts the communication between the adsorbent 41L and the blower 43L and opens the flow channel between the adsorbent 41L and the exhaust port 35L. At this time, the adsorbent 41L and the exhaust port 35L communicate with each other. With this placement of the first intake door 50L and the second intake door 52L, the outside-air introduction circuit is formed, and, with this placement of the exhaust switching door 54L, a flow channel that exhausts the outside air to the outside of the vehicle cabin is formed.

The fourth motor 57L drives the first door 56L. The first door 56L blocks the first flow channel 70L and the second flow channel 71L. The fifth motor 59L keeps the position of the second door 58L. The second door 58L blocks the windshield's-side flow channel 73L between the upper-layer heater core 48L and the windshield's-side air outlet port 32L and between the lower-layer heater core 49L and the windshield's-side air outlet port 32L. The sixth motor 61L drives the third door 60L. The third door 60L opens the adsorbent's-side flow channel 74L between the upper-layer heater core 48L and the adsorbent 41L and between the lower-layer heater core 49L and the adsorbent 41L. At this time, via the dust filter 40, the upper-layer heater core 48L and the adsorbent 41L communicate with each other and the lower-layer heater core 49L and the adsorbent 41L communicate with each other.

The seventh motor 63L keeps the position of the fourth door 62L. The fourth door 62L opens the upper-part flow channel 75L between the upper-layer heater core 48L and the upper-part air outlet port 33L and between the lower-layer heater core 49L and the upper-part air outlet port 33L, and blocks the lower-part flow channel 76L between the upper-layer heater core 48L and the lower-part air outlet port 34L and between the lower-layer heater core 49L and the lower-part air outlet port 34L. At this time, the upper-layer heater core 48L and the upper-part air outlet port 33L communicate with each other and the lower-layer heater core 49L and the upper-part air outlet port 33L communicate with each other.

On the other hand, the first to seventh motors 51R to 63R of the right-side operation section 22R keep the positions of the doors.

As depicted in FIG. 7, the left-side operation section 22L circulates the air by outside-air circulation. The outside air sucked in through the outside-air inlet port 31 sequentially passes through the dust filter 40 and the blower 43L and is guided to the upper layer of the evaporator 47. The outside air that has passed through the upper layer of the evaporator 47 is heated when passing through the left upper-layer heater core 48L and turns into warm air. The warm air passes through the adsorbent's-side flow channel 74L, sequentially passes through the dust filter 40 and the adsorbent 41L, and is exhausted from the exhaust port 35L. The adsorbent 41L is heated when the warm air passes through the adsorbent 41L, and water contained in the adsorbent 41L evaporates. The evaporated water is exhausted from the exhaust port 35L with the warm air.

The outside air that has passed through the upper layer of the evaporator 47 and the right upper-layer heater core 48R passes through the upper-part flow channel 75R and is blown out through the upper-part air outlet port 33R.

After performing the regeneration treatment of the adsorbent 41L for a second predetermined time, the control device 18 switches between the operation of the left-side operation section 22L and the operation of the right-side operation section 22R and performs the regeneration treatment of the adsorbent 41R.

[3.3. Heat Mode (at the Time of Warm-up)]

The position control of each door at the time of warm-up in the heat mode will be described with reference to FIG. 8, and the flow of air in this case will be described with reference to FIG. 9.

When the vehicle occupant turns on the air-conditioning switch of the operating device 14 to set it to the heat mode, the control device 18 outputs the drive current in accordance with the heat mode to the first to seventh motors 51L to 63L.

As depicted in FIG. 8, the first motor 51L drives the first intake door 50L. The first intake door 50L interrupts the communication between the outside-air inlet port 31 and the blower 43L. The second motor 53L drives the second intake door 52L. The second intake door 52L opens the flow channel between the inside-air inlet port 30L and the dust filter 40. At this time, the inside-air inlet port 30L and the dust filter 40 communicate with each other. The third motor 55L drives the exhaust switching door 54L. The exhaust switching door 54L opens the flow channel between the adsorbent 41L and the blower 43L and interrupts the communication between the adsorbent 41L and the exhaust port 35L. At this time, the adsorbent 41L and the blower 43L communicate with each other. With this placement of the first intake door 50L, the second intake door 52L, and the exhaust switching door 54L, the inside-air circulation circuit is formed.

The fourth motor 57L drives the first door 56L. The first door 56L opens the first flow channel 70L and the second flow channel 71L. At this time, the first flow channel 70L and the second flow channel 71L communicate with each other. The fifth motor 59L drives the second door 58L. The second door 58L partly opens the windshield's-side flow channel 73L between the upper-layer heater core 48L and the windshield's-side air outlet port 32L and between the lower-layer heater core 49L and the windshield's-side air outlet port 32L. The sixth motor 61L drives the third door 60L. The third door 60L blocks the adsorbent's-side flow channel 74L between the upper-layer heater core 48L and the adsorbent 41L and between the lower-layer heater core 49L and the adsorbent 41L.

The seventh motor 63L drives the fourth door 62L. The fourth door 62L blocks the upper-part flow channel 75L between the upper-layer heater core 48L and the upper-part air outlet port 33L and between the lower-layer heater core 49L and the upper-part air outlet port 33L, and opens the lower-part flow channel 76L between the upper-layer heater core 48L and the lower-part air outlet port 34L and between the lower-layer heater core 49L and the lower-part air outlet port 34L. At this time, the upper-layer heater core 48L and the lower-part air outlet port 34L communicate with each other and the lower-layer heater core 49L and the lower-part air outlet port 34L communicate with each other.

As depicted in FIG. 9, the left-side operation section 22L circulates the air by inside-air circulation. The inside air sucked in through the inside-air inlet port 30L sequentially passes through the dust filter 40, the adsorbent 41L, and the blower 43L and is guided to the upper layer of the evaporator 47. The inside air that has passed through the upper layer of the evaporator 47 and the upper-layer heater core 48L is blown out through the windshield's-side air outlet port 32L and the lower-part air outlet port 34L. Moreover, the inside air that has passed through the upper layer of the evaporator 47 and the upper-layer heater core 48R is blown out through a windshield's-side air outlet port 32R and the lower-part air outlet port 34R.

The right-side operation section 22R also circulates the air by inside-air circulation. The inside air that is circulated by the right-side operation section 22R is guided to a lower layer of the evaporator 47. The inside air that has passed through the lower layer of the evaporator 47 and the left lower-layer heater core 49L is mainly blown out through the lower-part air outlet port 34L. Moreover, the inside air that has passed through the lower layer of the evaporator 47 and the right lower-layer heater core 49R is mainly blown out through the lower-part air outlet port 34R.

[3.4. Heat Mode (When the Ambient Temperature is Stabilized)]

The position control of each door when the ambient temperature is stabilized in the heat mode will be described with reference to FIG. 10, and the flow of air in this case will be described with reference to FIG. 11. The following operation is performed when a regeneration condition is met in the operation mode of [3.3] described above.

When the ambient temperature is stabilized by the heat mode, the control device 18 outputs the drive current in accordance with the regeneration treatment to the first to seventh motors 51L to 63L. Moreover, the control device 18 operates the upper-layer heater core 48L if the upper-layer heater core 48L is not operating.

As depicted in FIG. 10, the first motor 51L drives the first intake door 50L. The first intake door 50L opens the flow channel between the outside-air inlet port 31 and the blower 43L. At this time, the outside-air inlet port 31 and the blower 43L communicate with each other. The second motor 53L drives the second intake door 52L. The second intake door 52L interrupts the communication between the inside-air inlet port 30L and the dust filter 40. The third motor 55L drives the exhaust switching door 54L. The exhaust switching door 54L interrupts the communication between the adsorbent 41L and the blower 43L and opens the flow channel between the adsorbent 41L and the exhaust port 35L. At this time, the adsorbent 41L and the exhaust port 35L communicate with each other. With this placement of the first intake door 50L and the second intake door 52L, the outside-air introduction circuit is formed, and, with this placement of the exhaust switching door 54L, a flow channel that exhausts the outside air to the outside of the vehicle cabin is formed.

The fourth motor 57L drives the first door 56L. The first door 56L blocks the first flow channel 70L and the second flow channel 71L. The fifth motor 59L drives the second door 58L. The second door 58L blocks the windshield's-side flow channel 73L between the upper-layer heater core 48L and the windshield's-side air outlet port 32L and between the lower-layer heater core 49L and the windshield's-side air outlet port 32L. The sixth motor 61L drives the third door 60L. The third door 60L opens the adsorbent's-side flow channel 74L between the upper-layer heater core 48L and the adsorbent 41L and between the lower-layer heater core 49L and the adsorbent 41L. At this time, via the dust filter 40, the upper-layer heater core 48L and the adsorbent 41L communicate with each other and the lower-layer heater core 49L and the adsorbent 41L communicate with each other.

The seventh motor 63L keeps the position of the fourth door 62L. The fourth door 62L blocks the upper-part flow channel 75L between the upper-layer heater core 48L and the upper-part air outlet port 33L and between the lower-layer heater core 49L and the upper-part air outlet port 33L, and opens the lower-part flow channel 76L between the upper-layer heater core 48L and the lower-part air outlet port 34L and between the lower-layer heater core 49L and the lower-part air outlet port 34L. At this time, the upper-layer heater core 48L and the lower-part air outlet port 34L communicate with each other and the lower-layer heater core 49L and the lower-part air outlet port 34L communicate with each other.

On the other hand, the first to seventh motors 51R to 63R of the right-side operation section 22R keep the positions of the doors.

As depicted in FIG. 11, the left-side operation section 22L circulates the air by outside-air circulation. The outside air sucked in through the outside-air inlet port 31 sequentially passes through the dust filter 40 and the blower 43L and is guided to the upper layer of the evaporator 47. The outside air that has passed through the upper layer of the evaporator 47 is heated when passing through the left upper-layer heater core 48L and turns into warm air. The warm air passes through the adsorbent's-side flow channel 74L, sequentially passes through the dust filter 40 and the adsorbent 41L, and is exhausted from the exhaust port 35L. The adsorbent 41L is heated when the warm air passes through the adsorbent 41L, and water contained in the adsorbent 41L evaporates. The evaporated water is exhausted from the exhaust port 35L with the warm air.

The outside air that has passed through the upper layer of the evaporator 47 and the right upper-layer heater core 48R passes through a windshield's-side flow channel 73R and is blown out through the windshield's-side air outlet port 32R.

After performing the regeneration treatment of the adsorbent 41L for the second predetermined time, the control device 18 switches between the operation of the left-side operation section 22L and the operation of the right-side operation section 22R and performs the regeneration treatment of the adsorbent 41R.

4. Summary of the Present Embodiment

The vehicle air-conditioning device 10 includes: the inside-air inlet port 30L configured to suck in the air inside the vehicle cabin; the outside-air inlet port 31 configured to suck in the air outside the vehicle cabin; the adsorbent 41L configured to adsorb water contained in the air, including the adsorbent inflow section 41Li into which the air sucked in through the inside-air inlet port 30L flows and the adsorbent outflow section 41Lo from which the air flows; the temperature regulating device 46 configured to regulate the temperature of the air, including the temperature regulating device inflow section 46*i* into which the air flowed from the adsorbent 41L or the air sucked in through the outside-air inlet port 31 flows, and the temperature regulating device outflow section 46*o* from which the air flows; the windshield's-side air outlet port 32L configured to blow the air flowed from the temperature regulating device 46 toward the windshield in the vehicle cabin; and the other air outlet port 36L configured to blow the air flowed from the temperature regulating device 46 toward the area other than the windshield in the vehicle cabin. The first flow channel 70L is connected to the temperature regulating device outflow section 46*o* of the temperature regulating device 46, and the second flow channel 71L is connected to the first flow channel 70L. The windshield's-side flow channel 73L and the adsorbent's-side flow channel 74L are formed in the first flow channel 70L, downstream of the connection point (the first door 56L) of the first flow channel 70L and the second flow channel 71L. The windshield's-side flow channel 73L is configured to guide the air to the windshield's-side air outlet port 32L and the adsorbent's-side flow channel 74L is configured to guide the air to the adsorbent inflow section 41Li. The other flow channel (the upper-part flow channel 75L, the lower-part flow channel 76L) is formed in the second flow channel 71L, and configured to guide the air to the other air outlet port 36L. The first door 56L is provided between the first flow channel 70L and the second flow channel 71L, and configured to switch between a state in which the first flow channel 70L and the second flow channel 71L communicate with each other and a state in which the communication between the first flow channel 70L and the second flow channel 71L is interrupted. The second door 58L is provided in the windshield's-side flow channel 73L, and configured to switch between a state in which the temperature regulating device outflow section 46*o* and the windshield's-side air outlet port 32L communicate with each other and a state in which the communication between the temperature regulating device outflow section 46*o* and the windshield's-side air outlet port 32L is interrupted. The third door 60L is provided in the adsorbent's-side flow channel 74L, and configured to switch between a state in which the temperature regulating device outflow section 46*o* and the adsorbent inflow section 41Li communicate with each other and a state in which the communication between the temperature regulating device outflow section 46*o* and the adsorbent inflow section 41Li is interrupted. At the time of the regeneration treatment of the adsorbent 41L, in the vehicle air-conditioning device 10, the air warmed by the temperature regulating device 46 is guided to the adsorbent 41L, by placing the first door 56L and the second door 58L in the state of interruption, and placing the third door 60L in the state of communication.

With the above-described configuration, by interrupting the communication between the first flow channel 70L and the second flow channel 71L, interrupting the communication between the temperature regulating device outflow section 46*o* and the windshield's-side air outlet port 32L, and making the temperature regulating device outflow section 46*o* and the adsorbent inflow section 41Li communicate with each other, the air warmed by the temperature regulating device 46 (in the present embodiment, the upper-layer heater core 48L) is preferentially guided to the adsorbent 41L, which makes it possible to make the most of the air warmed by the temperature regulating device 46 for regeneration of the adsorbent 41L, and reduce the heating energy of a heater without a decrease in heating performance.

The vehicle air-conditioning device 10 includes the two adsorbents 41L, 41R. The vehicle air-conditioning device 10 concurrently forms the outside-air introduction circuit configured to guide the air sucked in through the outside-air inlet port 31 to the temperature regulating device 46 and the inside-air circulation circuit configured to guide the air sucked in through the inside-air inlet port 30L or the inside-air inlet port 30R to the temperature regulating device 46. At the time of the regeneration treatment of the adsorbent 41L which is one of the two adsorbents 41L, 41R, the vehicle air-conditioning device 10 is configured to suck in air required for regeneration through the outside-air inlet port 31, warm the sucked-in air by the temperature regulating device 46, guide the warmed air to the adsorbent inflow section 41Li of the adsorbent 41L, and exhaust the air flowing from the adsorbent outflow section 41Lo of the adsorbent 41L.

With the above-described configuration, since air required for regeneration treatment can be sucked in from the outside of the vehicle cabin and the air inside the vehicle cabin can be circulated by inside-air circulation, it is possible to perform the regeneration treatment of the adsorbent 41L without affecting air conditioning in the vehicle cabin.

The vehicle air-conditioning device 10 includes the outside-air introduction flow channel 77 is configured to guide the air sucked in through the outside-air inlet port 31 to a space between the adsorbent outflow section 41Lo and the temperature regulating device inflow section 46*i*. The two adsorbents 41L, 41R are disposed separately from each other in the vehicle-width direction, and the position of the outside-air introduction flow channel 77 in the vehicle-width direction is a position between the two adsorbents 41L, 41R in the vehicle-width direction.

With the above-described configuration, the outside-air introduction circuit including the one adsorbent 41L and the outside-air introduction circuit including the other adsorbent 41R can share the outside-air introduction flow channel 77. This simplifies the structure.

The adsorbent 41L is disposed in a position closer to the front of the vehicle than the windshield's-side air outlet port 32L.

With the above-described configuration, it is possible to use part of the windshield's-side flow channel 73L that guides the warm air to the windshield's-side air outlet port 32L from the temperature regulating device 46 for defogging/defrosting, as part of the adsorbent's-side flow channel 74L. This simplifies the structure.

The vehicle air-conditioning device 10 includes the dust filter 40 between the inside-air inlet port 30L and the adsorbent inflow section 41Li.

With the above-described configuration, since dirt and dust can be captured on the upstream side of the adsorbent 41L, it is possible to keep the adsorbent 41L clean and increase maintenance intervals of the vehicle air-conditioning device 10.

The two blowers 43L, 43R configured to generate the flow of air are disposed separately from each other in the vehicle-width direction. The positions of the two adsorbents 41L, 41R in the vehicle-width direction are positions between the two blowers 43L, 43R in the vehicle-width direction.

With the above-described configuration, it is possible to simplify the structure of a device (the air-conditioning operation section 20) including the two adsorbents 41L, 41R and the two blowers 43L, 43R.

The present invention is not particularly limited to the embodiment described above, and various modifications are possible without departing from the essence and gist of the present invention.

What is claimed is:

1. A vehicle air-conditioning device comprising:
an inside-air inlet port configured to suck in air inside a vehicle cabin;
an outside-air inlet port configured to suck in air outside the vehicle cabin;
an adsorbent configured to adsorb water contained in the air, including an adsorbent inflow section into which the air sucked in through the inside-air inlet port flows and an adsorbent outflow section from which the air flows;
a temperature regulating device configured to regulate a temperature of the air, including a temperature regulating device inflow section into which the air flowed from the adsorbent or the air sucked in through the outside-air inlet port flows, and a temperature regulating device outflow section from which the air flows;
a windshield's-side air outlet port configured to blow the air flowed from the temperature regulating device toward a windshield in the vehicle cabin; and
another air outlet port configured to blow the air flowed from the temperature regulating device toward an area other than the windshield in the vehicle cabin,
wherein a first flow channel is connected to the temperature regulating device outflow section of the temperature regulating device,
a second flow channel is connected to the first flow channel,
a windshield's-side flow channel and an adsorbent's-side flow channel are formed in the first flow channel, downstream of a connection point of the first flow channel and the second flow channel, the windshield's-side flow channel configured to guide the air to the windshield's-side air outlet port and the adsorbent's-side flow channel configured to guide the air to the adsorbent inflow section,
another flow channel is formed in the second flow channel, and configured to guide the air to the other air outlet port,
a first door is provided between the first flow channel and the second flow channel, and configured to switch between a state in which the first flow channel and the second flow channel communicate with each other and a state in which the communication between the first flow channel and the second flow channel is interrupted,
a second door is provided in the windshield's-side flow channel, and configured to switch between a state in which the temperature regulating device outflow section and the windshield's-side air outlet port communicate with each other and a state in which the communication between the temperature regulating device outflow section and the windshield's-side air outlet port is interrupted,
a third door is provided in the adsorbent's-side flow channel, and configured to switch between a state in which the temperature regulating device outflow section and the adsorbent inflow section communicate with each other and a state in which the communication between the temperature regulating device outflow section and the adsorbent inflow section is interrupted, and
at a time of regeneration treatment of the adsorbent, the air warmed by the temperature regulating device is guided to the adsorbent, by placing the first door and the second door in the state of interruption, and placing the third door in the state of communication.

2. The vehicle air-conditioning device according to claim 1, wherein the adsorbent comprises two adsorbents,
the vehicle air-conditioning device concurrently forms an outside-air introduction circuit configured to guide the air sucked in through the outside-air inlet port to the temperature regulating device, and an inside-air circulation circuit configured to guide the air sucked in through the inside-air inlet port to the temperature regulating device, and
at a time of regeneration treatment of one of the two adsorbents, the vehicle air-conditioning device is configured to suck in air required for regeneration through the outside-air inlet port, warm the sucked-in air by the temperature regulating device, guide the warmed air to the adsorbent inflow section of the one adsorbent, and exhaust the air flowing from the adsorbent outflow section of the one adsorbent.

3. The vehicle air-conditioning device according to claim 2, further comprising an outside-air introduction flow channel configured to guide the air sucked in through the outside-air inlet port to a space between the adsorbent outflow section and the temperature regulating device inflow section,
wherein the two adsorbents are disposed separately from each other in a vehicle-width direction, and
a position of the outside-air introduction flow channel in the vehicle-width direction is a position between the two adsorbents in the vehicle-width direction.

4. The vehicle air-conditioning device according to claim 2, wherein two blowers configured to generate a flow of air are disposed separately from each other in a vehicle-width direction, and
positions of the two adsorbents in the vehicle-width direction are positions between the two blowers in the vehicle-width direction.

5. The vehicle air-conditioning device according to claim 1, wherein the adsorbent is disposed in a position closer to a front of a vehicle than the windshield's-side air outlet port.

6. The vehicle air-conditioning device according to claim 1, further comprising a dust filter between the inside-air inlet port and the adsorbent inflow section.

* * * * *